Figure 1:
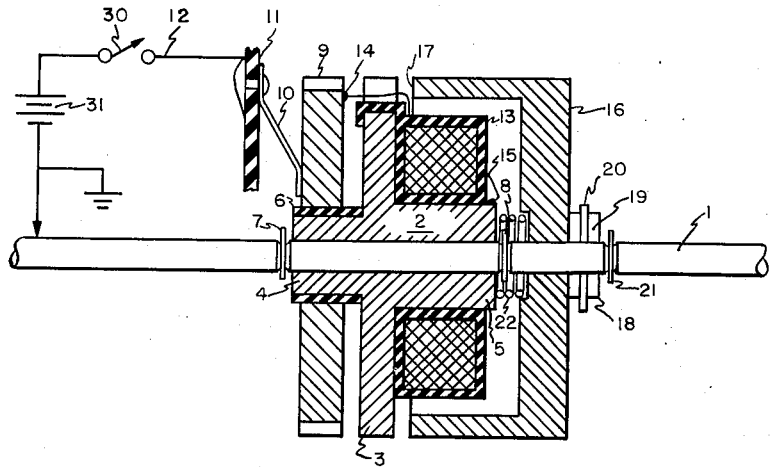

Jan. 3, 1961 G. H. BROWER ET AL 2,966,976
MAGNETIC CLUTCH
Filed Aug. 8, 1957

GORDON COOPER
GEORGE H. BROWER
BASIL P. HOOTEN
INVENTORS

BY
*Killman and Kerst*
ATTORNEYS

United States Patent Office 2,966,976
Patented Jan. 3, 1961

2,966,976

MAGNETIC CLUTCH

George H. Brower, Lutherville, and Basil P. Hooten, Towson, Md., and Gordon Cooper, Winter Park, Fla., assignors to The Bendix Corporation, a corporation of Delaware Filed Aug. 8, 1957, Ser. No. 677,162

1 Claim. (Cl. 192—84)

This invention relates to clutches and more particularly to magnetically actuated clutches. The invention is directed to and has for its objects the improvement of such clutches in a manner to increase the amount of torque obtainable from a clutch of a given overall size, to increase the ratio of energized torque to deenergized torque and to reduce the clutch release time. These features are highly desirable in installations such as signal seeking tuners for radio receivers.

These and other objects and advantages of the invention are realized in a magnetically operated clutch in which the driving side of the clutch is allowed to rotate freely on its shaft but restrained from sliding therealong. The driven side is mounted on the same shaft, being secured against rotation relative thereto but allowed to slide thereon. The driving side comprises a cylindrical member having a central disk portion and a hub on each side thereof. On one hub is mounted the magnetic coil and on the other is mounted the final gear of the transmission train. The driven side is a cup-shaped element, the rim of which contacts the lateral peripheral surface of the disk when the clutch is energized and the bottom of which forms, with the coil mounting hub, an air-gap in the magnetic circuit.

Figure 2:
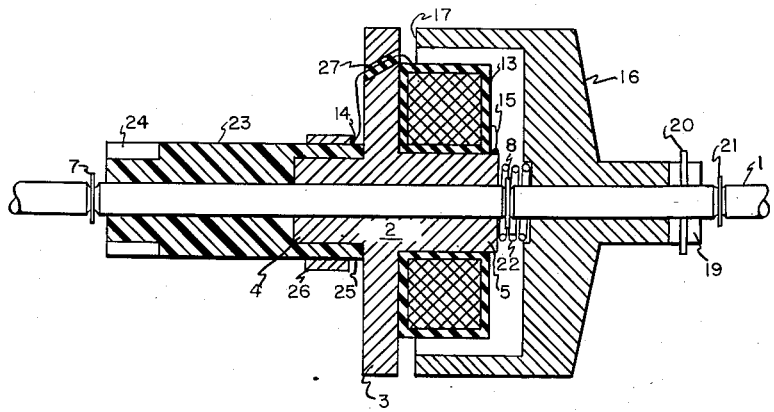

In the drawings:

Fig. 1 is an elevation, partly in cross-section, of a preferred embodiment of the invention, and Fig. 2 is a similar showing of a modification of the clutch arrangement of Fig. 1.

Referring more particularly to the drawings, there is shown a shaft 1, of non-magnetic material, which may be a pinion shaft forming part of a gear reduction train, upon which is mounted a cylindrical member 2. The member 2 has a cylindrical hub which is centrally extended to form a disk-shaped portion 3. To the left of the portion 3 is a cylindrical hub 4 and to the right is a second cylindrical hub 5 which is shown as having a larger diameter than the hub 4. The lateral surfaces of the hubs 4 and 5 and the right hand face of the portion 3 are coated with an insulating compound 6. The insulation 6 does not extend to the periphery of the portion 3. The member 2 is mounted to be freely rotatable about the shaft 1, but is restrained from sliding movement therealong by a pair of snap rings 7 and 8.

Fixed on the hub 4, by means of a pressed fit over the insulating layer 6, is a gear 9 of electrically conductive material which may be a worm wheel of a gear train. Coacting with the exposed lateral surface of the gear 9 is a wiping contact element 10 mounted on a supporting member 11 of insulating material and connected to an electrical conductor 12. The conductor 12 is shown connected by a switch 30 to a battery 31, the remaining terminal of which is grounded.

Mounted on the hub 5 for rotation therewith is a coil 13 having one terminal conductively secured to the gear at 14 and the other terminal conductively secured to the hub 5 at 15. The hub 5 and the shaft 1 may be considered to be grounded as indicated.

Mounted on the shaft 1 to the right of the member 2 is a cup-shaped element 16 of the same diameter as the portion 3 and having the end surface 17 of the upturned cup portion positioned adjacent the lateral peripheral surface of the portion 3. The central portion of the element 16 is provided with a hub 18 having a diametrical slot 19 formed therein. A pin 20 extends through the shaft 1 and lies within the slot 19, thus restraining the element 16 from relative rotation with respect to the shaft 1 but permitting axial movement along the shaft. A snap ring 21 on the shaft acts as a limit to movement of the element in a right hand direction. A spring 22 surrounding the shaft 1 between the element 16 and the hub 5 constrains the element 16 to move to the right against the snap ring 21.

In the operation of the device of Fig. 1 energization of the coil 13 pulls the member 16 to the left, overcoming the action of the spring 22 until the surface 17 comes into contact with the lateral surface of the portion 3 of the member 2. This locks the member 2, the gear 9, the member 16, and the shaft 1 into a unit for rotational purposes, transmitting the movement of gear 9 to the shaft 1. This arrangement does not require a separate slip ring for the contact member 10, the lateral surface of the gear 9 serving this purpose. It can be seen that the clutch action is independent of any axial thrust from the driving power source. Furthermore, all the magnetic attraction between the portion 3 and the member 16 is along the axis of the shaft 1 so that maximum torque transmission is obtained with a minimum of frictional losses. The distance between the end of the hub 5 and the element 16 is somewhat greater, say by .005", than the distance between the end surface 17 and the disk. This provides an air-gap in the magnetic circuit, the shaft being non-magnetic. This air-gap reduces the residual magnetism of the magnetic circuit and thus shortens the release time of the clutch.

In the form of the invention shown in Fig. 2, the gear wheel 9 of Fig. 1 has been replaced by a cylindrical nylon member 23 which has gear teeth formed, as at 24, in its left hand lateral peripheral surface, thus forming a gear wheel at the left hand end of the member. The right hand end of the member 23 is in the form of a sleeve 25 fitting closely around the hub 4 and fixed thereto for rotational purposes. Positioned around the portion 25 is a metallic slip ring 26. One of the terminal portions of the coil 13 is led through a hole 27 in the portion 3 and conductively secured at 14 to the slip ring 26. The remaining terminal of the coil is conductively secured to the hub 5 as at 15.

The action of this form of the invention is the same as that of Fig. 1. The nylon member 23 provides, in one piece, the gear wheel formed by the teeth 24 and insulation for the slip ring 26.

The spring 22 may be omitted in each form of the invention, if desired. It tends to provide a snap releasing action which is desirable. Its resistance must be overcome in energizing the clutch, however, requiring additional ampere turns for this purpose and thus increasing the residual magnetism.

What is claimed is:

A power transmitting assembly comprising: a non-magnetic shaft, a cylindrical member of magnetic material mounted on said shaft and freely rotatable with respect thereto, said cylindrical member comprising a central disk and a hub of smaller diameter than said disk on each side thereof, a gear wheel fixedly mounted on one of said hubs and electrically insulated therefrom, a coil wound about the other of said hubs and electrically insulated therefrom, a cup-shaped element of magnetic material mounted on said shaft for slidable movement therealong, said element being restrained from rotation relative to said shaft, said element being juxtaposed to and enclosing said other hub and said coil with the end surface of the cup thereof in adjacent relationship to the lateral peripheral surface of said disk and separated therefrom by a distance which is less than the distance separating said element from the end surface of said other hub, stop means limiting the sliding movement of said element away from said member, means forming an annular electrically conductive surface on a lateral face of said gear, said annular surface being concentric with said shaft and electrically insulated therefrom, means electrically connecting one terminal of said coil to said annular surface and means electrically connecting the remaining terminal of said coil to said shaft, whereby when an electrical current is passed from said annular surface to said shaft through said coil, said cup-shaped element will be drawn toward said member until said end surface of said cup rests against said lateral peripheral surface of said disk, with an air gap existing between said end surface of said other hub and said element, and said shaft will be rotationally locked to said gear wheel.

References Cited in the file of this patent

UNITED STATES PATENTS

| | | |
|---|---|---|
| 762,620 | Eastwood | June 14, 1904 |
| 1,167,602 | Strang | June 11, 1916 |
| 1,219,569 | Libby | Mar. 20, 1917 |
| 1,519,417 | Payne | Dec. 16, 1924 |
| 2,514,385 | Garbarini et al. | July 11, 1950 |
| 2,693,262 | Messinger | Nov. 21, 1954 |
| 2,722,303 | Utz | Nov. 1, 1955 |
| 2,751,056 | Aumuller | June 19, 1956 |

FOREIGN PATENTS

| | | |
|---|---|---|
| 79,227 | Switzerland | Nov. 1, 1919 |
| 410,424 | Italy | Apr. 19, 1945 |